United States Patent [19]

Plueddemann

[11] 3,889,023

[45] June 10, 1975

[54] SILICONE ELASTOMERS BONDED TO SOLID SUBSTRATES

[75] Inventor: Edwin P. Plueddemann, Midland, Mich.

[73] Assignee: Dow Corning Corporation, Midland, Mich.

[22] Filed: Oct. 4, 1973

[21] Appl. No.: 403,685

Related U.S. Application Data

[62] Division of Ser. No. 320,375, Jan. 2, 1973, Pat. No. 3,794,612.

[52] U.S. Cl. ............... 428/429; 428/447; 428/450
[51] Int. Cl. ...................... B32b 15/08; C03c 17/30
[58] Field of Search .......... 117/124 F, 133, 161 ZA, 117/138.8 B, 132 BS; 260/37 SB, 46.5 G

[56] References Cited
UNITED STATES PATENTS

| | | | |
|---|---|---|---|
| 2,639,276 | 5/1953 | Smith-Johannsen et al.. | 117/132 BS |
| 2,938,007 | 5/1960 | Savage | 260/31.8 S |
| 2,968,840 | 1/1961 | Morse | 117/132 BS |
| 3,305,504 | 2/1967 | Huntington | 117/132 BS |
| 3,730,932 | 5/1973 | De Zuba et al. | 260/37 SB |
| 3,772,066 | 11/1973 | Clark et al. | 117/132 BS |

*Primary Examiner*—William D. Martin
*Assistant Examiner*—Sadie L. Childs
*Attorney, Agent, or Firm*—Norman E. Lewis

[57] ABSTRACT

Composite articles in which silicone rubber is bonded to a solid substrate exhibit improved rubber adhesion when small amounts of diallylphthalate are added to the silicone rubber prior to curing the rubber while in contact with the substrate.

5 Claims, No Drawings

SILICONE ELASTOMERS BONDED TO SOLID SUBSTRATES

This is a division of application Ser. No. 320,375, filed Jan. 2, 1973, now U.S. Pat. No. 3,794,612.

The present invention relates to organopolysiloxane elastomeric composition which exhibits improved adhesion to unprimed substrates.

The adhesion of silicone elastomers to a variety of substrates, such as metals, glass, wood, ceramics and plastics, is of great importance to the use of such elastomers. As a general rule it is difficult to obtain good bonding between a silicone elastomer and a substrate. Some silicone elastomers do bond to a few substrates but to obtain adhesion to a variety of substrates, one must apply a primer to the surfaces to be bonded. Priming, although effective in most instances, has the disadvantages of being time consuming and adding to the materials cost of the bonded product. To avoid the use of primers, it is desirable to formulate elastomers with additive compositions to provide the desired adhesion. The addition of adhesion-promoting ingredients to silicone elastomer formulations is not without difficulties, since some ingredients can destroy elastomeric properties, degrade the polymeric base, provide handling problems, inhibit curing and the like.

The present invention provides an additive-containing silicone elastomer which exhibits good adhesion to a variety of substrates with only minor modification of other properties.

Thus, it is an object of the present invention to provide a siloxane composition which can be cured to an elastomer having improved adhesion to unprimed surfaces. It is another object of the invention to provide composite article containing silicone rubber bonded to a solid substrate. These other objects will be apparent to one skilled in the art upon reading the following detailed description of the invention.

This invention provides a silicone rubber composition comprising a. 100 parts by weight of a mixture consisting essentially of an organopolysiloxane gum of the unit formula $R_nSiO_{(4-n)/2}$ in which each R is selected from the group consisting of methyl, vinyl, phenyl and 3,3,3-trifluoropropyl radicals and $n$ has an average value of from 1.98 to 2.01 inclusive, a reinforcing silica and an organoperoxide vulcanizing agent; and b. from about 2 to 10 parts by weight of diallylphthalate.

The mixture (a) is a basic silicone rubber composition which is well known in the art. The conventional silicone elastomer stock is based on organopolysiloxane gums which contain methyl, vinyl, phenyl and/or 3,3,3-trifluoropropyl radicals attached to the silicon atoms of the polymeric siloxane. Examples of the organopolysiloxane gums are those polymers, copolymers and mixtures thereof wherein the siloxy units can be dimethylsiloxane, phenylmethylsiloxane, 3,3,3-trifluoropropylmethylsiloxane, diphenylsiloxane, methylvinylsiloxane and phenylvinylsiloxane. It is preferred that at least 50 percent of the total number of R radicals be methyl radicals. The vinyl radicals are present in an amount in the range of from 0 to 2 percent of the number of R radicals, which the phenyl radicals are present in an amount in the range of from 0 to 10 percent of the total number of organic radical. The 3,3,3-trifluoropropyl radicals can constitute from 0 to 50 percent of the total number of organic radicals. The organopolysiloxane gums are essentially linear polymers having an average of 1.98 to 2.01 silicon-bonded organic radicals per silicon atom. The endblocking units of the linear polymer can be trimethylsiloxy, dimethylvinylsiloxy, methylphenylvinylsiloxy, methyldiphenylsiloxy, 3,3,3-trifluoropropyldimethylsiloxy and like units. In addition to the named organic substituents, the trisubstituted endblocking units can contain hydroxyl radicals, such as hydroxydimethylsiloxy and hydroxyphenylmethylsiloxy units.

The silicone elastomer stock utilized in the present invention can contain any of the conventional reinforcing silica fillers. These fillers are well known in the art and are commercially available from a number of sources. The reinforcing silica fillers include fume silica and silica aerogel and can be treated, untreated or treated in situ. Treated silicas are manufactured by well-known methods wherein the treating agents include organosilanes, organopolysiloxanes and silazanes.

The organoperoxide vulcanizing agents for the elastomer stocks are well known in the art. The peroxides conventionally used include bis(2,4-dichlorobenzoyl)peroxide, benzoylperoxide, dicumyl peroxide, paradichlorobenzoyl peroxide, tertiary butyl perbenzoate, 2,5-bis(tertiary butyl peroxy)-2,5-dimethylhexane and ditertiary butyl peroxide. Other peroxide vulcanizing agents are enumerated in the prior art.

The ratio of the components of the silicone elastomer stock can vary broadly. Thus, the amount of reinforcing silica can vary from amounts in the range of from 10 to 200 parts by weight per 100 parts by weight of organopolysiloxane gum and the organoperoxide vulcanizing agent can vary from 0.1 to 10 parts by weight per 100 parts by weight of the organopolysiloxane gum. The foregoing proportions are those most commonly utilized in the art. A filler content of from 20 to 60 parts per 100 parts of polymer is preferred.

The combination of 100 parts of the above-described silicone elastomer stock (a) with from about 2 to 10 parts by weight of diallylphthalate results in a silicone rubber composition having improved adhesion to unprimed substrates. Diallylphthalate is readily prepared by reacting allyl alcohol with phthalic acid, isophthalic acid or terephthalic acid and as used herein diallylphthalate is inclusive of diallylisophthalate and diallylterephthalate. The unsaturated ester is commercially available. Diallylphthalate is relatively compatible with the unvulcanized silicone rubber and is believed to separate due to being only partially compatible during vulcanization to provide a surface layer having adhesive properties. Although moderate improvement in adhesion to some substrates will be observed at lower levels of diallylphthalate addition, it is preferred to add at least 2 parts of the ester per 100 parts of the elastomer stock to provide a general purpose composition having improved adhesion to variety of substrates. The optimum amount of additive will vary with the particular elastomer stock.

It has also been found that the addition of an unsaturated silane will enhance the effect of diallylphthalate in improving adhesion, especially that of retaining adhesion under conditions of high temperature and high humidity. Unsaturated silanes of the formula R'Si(OR'')$_3$ in which R' is a vinyl or allyl radical and R'' is a lower alkyl radical of from 1 to 4 inclusive atoms can be added in conjunction with the unsaturated ester. Vinyltrimethoxysilane, allyltriethoxysilane and vinyltriethoxysilane are exemplary of these unsaturated silanes. The silane can be added in an amount in the range of from 0.25 to 2.5 parts by weight per 100 parts by weight of the elastomer stock (a).

In addition to the above-described ingredients, the silicone rubber composition of the invention can contain heat stability additives, organic and inorganic fillers, compression set additives, additives to improve handling properties, additives to prevent crepe aging and other additives conventionally used in heat vulcanizable silicone elastomers.

The silicone rubber composition is readily prepared by mixing the ingredients. Mixing can be accomplished utilizing conventional techniques, such as by milling on a rubber mill. The ingredients can be combined in any order. Coating fluid ingredients, such as diallylphthalate and/or vinyltrimethoxysilanes, onto a small amount of filler and adding the coated filler to unvulcanized rubber stock is an effective method of preparing the compositions of the invention.

Composite articles incorporating a silicone elastomer bonded to a solid substrate can be fabricated by vulcanizing the described silicone rubber composition while in contact with the substrate. Vulcanization or curing is accomplished by heating the composition. The curing temperature will vary depending upon the length of time, the particular organopolysiloxane, the type and amount of peroxide and the fillers utilized. Generally the curing temperature is in the range of from 100° to 200°C and the time varies from a few seconds to several hours. The silicone rubber can be applied to any solid substrate, such as metal, for example steel, aluminum, copper or brass; masonary, stone, ceramic, glass, wood, and polymeric plastics, such as epoxy resins, acrylic resins, nylon, polyesters and the like. Of particular utility are articles comprising the elastomer bonded to mesh or fabric, such as hose or tubing for use in transparting heated fluids.

The following examples are illustrative, and not intended as limiting, of the invention defined in the claims. In the examples, reference to formulations based on "parts" designates parts by weight.

EXAMPLE 1

A silicone elastomer stock was prepared by milling a mixture of 100 parts of a dimethylvinylsiloxy terminated copolymer gum containing dimethylsiloxy and methylvinylsiloxy units with about 0.2% vinyl content, 33 parts of a reinforcing silica, 5 parts diatomaceous earth and 8.9 parts of conventional structure control and crepe aging additives. Sufficient dicumyl peroxide was added during milling to provide 2.5 weight percent of the vulcanizing agent in the elastomer stock.

The above silicone elastomer stock (100 parts) was milled with 4 parts of diallyl o-phthalate until a smooth band resulted. The modified silicone rubber composition was molded against various unprimed substrates for 15 minutes at 150°C. Adhesion of the vulcanized rubber was rated according to the following scale:

0 — no initial adhesion
1 — good initial adhesion, poor after 4 hours in water at room temperature
2 — good initial adhesion, poor after 24 hours in water at room temperature
3 — good adhesion after 24 hours in water at room temperature, poor after 1 hour in boiling water.
4 — good adhesion after 1 hour in boiling water, poor after 4 hours in boiling water
5 — good adhesion after 4 hours in boiling water A rating of "good" indicates cohesive failure of the rubber. For purposes of comparison, samples of the unmodified rubber were also bonded and vulcanized to the substrates and adhesion was determined. Results are given below:

| Substrate | Adhesion Rating of Silicone Rubber with 4 parts diallyl o-pthalate | Unmodified Silicone Rubber |
|---|---|---|
| Glass | 2 | 0 |
| Aluminum | 4 | 0 |
| Steel | 3 | 0 |
| Stainless Steel | 4 | 0 |
| Tin | 4 | 0 |
| Brass | 3 | 0 |
| Polyimide film | 5 | 0 |
| Polycarbonate film | 5 | 0 |
| Polyester film | 5 | 0 |
| Polyamide film | 5 | 0 |
| Polyester fabric | 4 | 0 |

Thus, the diallyl phthalate additive imparted good dry adhesion to glass, good dry and wet adhesion to several metals and good adhesion under severe conditions (boiling water) to a variety of synthetic polymeric plastics while the unmodified rubber lacked even initial adhesion to the substrates.

EXAMPLE 2

A mixture of one part vinyltrimethoxysilane and four parts of diallyl o-phthalate was mixed with and coated on five parts of a high surface area precipitated silica. The treated silica was then milled with 100 parts of the elastomer stock described in Example 1. This silicone rubber composition was molded against both glass and aluminum panels and vulcanized by heating for 15 minutes at 150°C.. Adhesion of the vulcanized rubber to these substrates was good even after the articles were immersed in boiling water for 4 hours.

EXAMPLE 3

A silicone elastomer stock was prepared by milling 100 parts of dimethylvinylsiloxy-terminated copolymer consisting of about 92.3 dimethylsiloxy units, about 7.5 phenylmethylsiloxy units and about 0.2 methylvinylsiloxy units, 42 parts of reinforcing silica filler, 10 parts hydroxy-terminated polydimethylsiloxane fluid and 10 parts of a non-reinforcing filler and pigment. A mixture of four parts diallylphthalate, one part vinyltriethoxysilane, three parts of a diatomaceous filler and 1 part benzoyl peroxide was milled with 100 parts of the described elastomer stock.

The modified silicone rubber was vulcanized against various substrates for 5 minutes at 260°F. Adhesion to aluminum, brass, copper, stainless steel, cold-rolled steel and polyester fabric was excellent with cohesive failure on each substrate. Equivalent results are obtained when hydroxy-terminated polydimethylsiloxane gum is substituted for the phenyl-containing copolymer in the above-described elastomer stock.

EXAMPLE 4

A silicone elastomer stock was prepared by milling 100 parts of a hydroxy-terminated copolymer gum containing about 99.6% 3,3,3-trifluoropropylmethylsiloxy units and about 0.4% methylvinylsiloxy units, 0.6 parts 2,4-dichloro-benzoyl peroxide, 42 parts reinforcing silica filler, 25 parts hydroxy-terminated 3,3,3-trifluoropropylmethylpolysiloxane fluid and 2.1 parts stability additive. A mixture of four parts diallylphthalate, one part vinyltriethoxysilane and three parts of a diatomaceous filler was milled with 100 parts of the described elastomer stock. The modified fluorosilicone rubber was molded onto an unprimed aluminum panel and vulcanized for 10 minutes at 150°F. then post cured for 8 hours at 200°C. For purposes of comparison, a portion of the unmodified fluorosilicone elastomer was bonded under the same conditions to an aluminum panel which had been coated with a commercially available primer composition. The silicone elastomer of the invention exhibited cohesive failure at 10.3 lb./in. width at 180° pull on the Instrom tester while the use of the unmodified elastomer and a primer gave adhesive failure of the bond at 5.8 lb./in.

Thus, it is apparent that the modified silicone rubber compositions of the present invention exhibit improved adhesion to unprimed substrates. Reasonable modification and variation are within the scope of the claimed invention.

That which is claimed is:

1. A composite article comprising a solid substrate having bonded thereto a cured silicone rubber composition comprising (a) 100 parts by weight of a mixture consisting essentially of an organopolysiloxane gum of the unit formula $R_nSiO_{(4-n)/2}$ in which R is selected from the group consisting of methyl, vinyl, phenyl and 3,3,3-trifluoropropyl radicals and $n$ has an average value of from 1.98 to 2.01 inclusive, a reinforcing silica and an organoperoxide vulcanizing agent; and (b) from about 2 to 10 parts by weight of diallylphthalate.

2. A composite article in accordance with claim 1 wherein said cured rubber composition includes from 0.25 to 2.5 parts by weight of $R'(OR'')_3$ in which $R'$ is a vinyl or alkyl radical and $R''$ is a lower alkyl radical containing from 1 to 4 inclusive carbon atoms.

3. A composite article in accordance with claim 1 wherein the substrate is metal.

4. A composite article in accordance with claim 1 wherein the substrate is glass.

5. A composite article in accordance with claim 1 wherein the substrate is a synthetic polymeric material.

* * * * *